(12) United States Patent
Kupratis et al.

(10) Patent No.: US 12,459,631 B2
(45) Date of Patent: Nov. 4, 2025

(54) AIRCRAFT VERTICAL STABILIZER WITH MOVEABLE PROPULSION SYSTEM(S)

(71) Applicant: RTX Corporation, Farmington, CT (US)

(72) Inventors: Daniel B. Kupratis, Wallingford, CT (US); Benjamin T. Mylrea, Jupiter, FL (US); Paul R. Hanrahan, Sedona, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/437,801

(22) Filed: Feb. 9, 2024

(65) Prior Publication Data

US 2025/0256833 A1  Aug. 14, 2025

(51) Int. Cl.
| | | |
|---|---|---|
| *B64C 5/06* | (2006.01) | |
| *B64C 39/10* | (2006.01) | |
| *B64D 27/20* | (2006.01) | |

(52) U.S. Cl.
CPC ............... *B64C 5/06* (2013.01); *B64C 39/10* (2013.01); *B64D 27/20* (2013.01); *B64C 2039/105* (2013.01)

(58) Field of Classification Search
CPC .............. B64C 5/02; B64C 5/06; B64C 15/12
See application file for complete search history.

(56) References Cited

U.S. PATENT DOCUMENTS

| | | | | |
|---|---|---|---|---|
| 2,580,176 A | * | 12/1951 | Johnson | ..................... B64C 5/06 244/91 |
| 3,570,789 A | * | 3/1971 | Rainey | ..................... B64C 9/00 244/159.3 |
| 4,149,688 A | * | 4/1979 | Miller, Jr. | ........... B64C 29/0033 244/12.4 |
| 5,813,628 A | * | 9/1998 | Hahl | ..................... B64C 39/00 244/218 |
| 5,823,468 A | * | 10/1998 | Bothe | ..................... B64B 1/34 244/209 |
| 6,170,780 B1 | * | 1/2001 | Williams | ................ B64C 23/00 244/54 |
| 6,923,403 B1 | * | 8/2005 | Dizdarevic | ........... B64C 1/0009 244/36 |

(Continued)

OTHER PUBLICATIONS

EP Search Report for EP Patent Application No. 25156966.1 dated May 22, 2025.

*Primary Examiner* — Joshua J Michener
*Assistant Examiner* — Michael B. Kreiner
(74) *Attorney, Agent, or Firm* — Getz Balich LLC (57) ABSTRACT

An assembly is provided for an aircraft. This assembly includes a vertical stabilizer, a first turbine engine, a second turbine engine and an actuation system. The vertical stabilizer extends spanwise from a stabilizer base to a stabilizer tip. The vertical stabilizer extends longitudinally from a stabilizer leading edge to a stabilizer trailing edge. The vertical stabilizer extends laterally between a stabilizer first side and a stabilizer second side. The first turbine engine is movably mounted to the vertical stabilizer at the stabilizer first side. The second turbine engine is moveably mounted to the vertical stabilizer at the stabilizer second side. The actuation system is configured to move the first turbine engine and the second turbine engine relative to the vertical stabilizer.

17 Claims, 11 Drawing Sheets

(56) References Cited

U.S. PATENT DOCUMENTS

| | | | | |
|---|---|---|---|---|
| 7,472,863 B2* | 1/2009 | Pak | ................ | B64D 35/04 |
| | | | | 244/12.5 |
| 7,581,696 B2* | 9/2009 | Morgan | ................ | B64C 5/06 |
| | | | | 244/45 R |
| 7,644,888 B2* | 1/2010 | Eakins | ................ | B64C 1/0009 |
| | | | | 244/119 |
| 7,793,884 B2* | 9/2010 | Dizdarevic | ............ | B64C 39/12 |
| | | | | 244/36 |
| 7,967,243 B2* | 6/2011 | Verde Preckler | ....... | B64C 15/12 |
| | | | | 244/75.1 |
| 7,997,528 B2* | 8/2011 | Lang | ................ | G05D 1/0653 |
| | | | | 244/75.1 |
| 8,128,023 B2* | 3/2012 | Cazals | ................ | B64C 5/02 |
| | | | | 244/45 R |
| 8,342,446 B2* | 1/2013 | Chareyre | ............ | B64C 5/18 |
| | | | | 244/91 |
| 8,360,359 B2* | 1/2013 | Llamas Sandin | ......... | B64C 1/26 |
| | | | | 244/87 |
| 8,398,022 B2* | 3/2013 | Cazals | ................ | B64D 27/20 |
| | | | | 244/119 |
| 8,608,109 B2* | 12/2013 | Campbell | ................ | B64C 1/00 |
| | | | | 244/119 |
| 8,820,676 B2* | 9/2014 | Cazals | ............ | B64C 29/0033 |
| | | | | 244/56 |
| 10,633,077 B2* | 4/2020 | Sauvinet | ............ | B64C 9/00 |
| 11,661,182 B2 | 5/2023 | Shaanan | | |
| 12,024,286 B1* | 7/2024 | Page | ............ | B64C 39/10 |
| 2007/0023571 A1* | 2/2007 | Kawai | ............ | B64D 27/16 |
| | | | | 244/119 |
| 2011/0168835 A1 | 7/2011 | Oliver | | |
| 2018/0327104 A1 | 11/2018 | Abele | | |
| 2023/0034488 A1 | 2/2023 | Sathya | | |
| 2023/0234718 A1 | 7/2023 | Masefield | | |

* cited by examiner

AIRCRAFT VERTICAL STABILIZER WITH MOVEABLE PROPULSION SYSTEM(S)

BACKGROUND OF THE DISCLOSURE

1. Technical Field

This disclosure relates generally to an aircraft and, more particularly, to propulsion system arrangements for the aircraft.

2. Background Information

Various propulsion system arrangements for an aircraft are known in the art. While these known propulsion system arrangements have various benefits, there is still room in the art for improvement.

SUMMARY OF THE DISCLOSURE

According to an aspect of the present disclosure, an assembly is provided for an aircraft. This assembly includes a vertical stabilizer, a first turbine engine, a second turbine engine and an actuation system. The vertical stabilizer extends spanwise from a stabilizer base to a stabilizer tip. The vertical stabilizer extends longitudinally from a stabilizer leading edge to a stabilizer trailing edge. The vertical stabilizer extends laterally between a stabilizer first side and a stabilizer second side. The first turbine engine is movably mounted to the vertical stabilizer at the stabilizer first side. The second turbine engine is moveably mounted to the vertical stabilizer at the stabilizer second side. The actuation system is configured to move the first turbine engine and the second turbine engine relative to the vertical stabilizer.

According to another aspect of the present disclosure, another assembly is provided for an aircraft. This assembly includes a vertical stabilizer, a first propulsion system, a second propulsion system and an actuation system. The vertical stabilizer extends spanwise from a stabilizer base to a stabilizer tip. The vertical stabilizer extends longitudinally from a stabilizer leading edge to a stabilizer trailing edge. The vertical stabilizer extends laterally between a stabilizer first side and a stabilizer second side. The first propulsion system includes a first propulsor rotor rotatable about a first axis. The first propulsion system is movably coupled to the vertical stabilizer at the stabilizer first side. The second propulsion system includes a second propulsor rotor rotatable about a second axis. The second propulsion system is movably coupled to the vertical stabilizer at the stabilizer second side. The actuation system is configured to move the first axis and the second axis relative to the vertical stabilizer.

According to still another aspect of the present disclosure, another assembly is provided for an aircraft. This assembly includes an aircraft body, a vertical stabilizer, a first turbine engine and an actuation system. The aircraft body extends along a centerline from a body forward end to a body aft end. The aircraft body is configured as or otherwise includes a fuselage. The vertical stabilizer projects vertically out from the aircraft body. The first turbine engine is movably mounted with the vertical stabilizer. The first turbine engine includes a first engine rotating assembly rotatable about a first engine axis. The first engine rotating assembly includes a first engine turbine rotor. The actuation system is configured to change an angle between the first engine axis and the centerline by moving the first turbine engine relative to the vertical stabilizer.

The assembly may also include a second turbine engine movably mounted with the vertical stabilizer. The second turbine engine may include a second engine rotating assembly rotatable about a second engine axis that is offset from the first engine axis. The second engine rotating assembly may include a second engine turbine rotor. The actuation system may also be configured to change an angle between the second engine axis and the centerline by moving the second turbine engine relative to the vertical stabilizer.

The first propulsor rotor may be a first ducted propulsor rotor. The second propulsor rotor may be a second ducted propulsor rotor.

The first propulsion system may be configured as or otherwise include a first turbine engine. The second propulsion system may be configured as or otherwise include a second turbine engine.

The actuation system may be configured to move the first turbine engine and the second turbine engine together.

The first turbine engine and the second turbine engine may each be pivotally mounted to the vertical stabilizer.

The actuation system may be configured to: pivot the first turbine engine about a first pivot axis; and pivot the second turbine engine about a second pivot axis that is concentric with the first pivot axis.

The assembly may also include an aircraft body extending along a centerline between a body forward end and a body aft end. The first turbine engine may include a first engine rotating assembly rotatable about a first engine axis. The first engine rotating assembly may include a first engine turbine rotor. The actuation system may be configured to change an angle between the first engine axis and the centerline by moving the first turbine engine relative to the vertical stabilizer. The second turbine engine may include a second engine rotating assembly rotatable about a second engine axis. The second engine rotating assembly may include a second engine turbine rotor. The actuation system may be configured to change an angle between the second engine axis and the centerline by moving the second turbine engine relative to the vertical stabilizer.

The assembly may also include a first horizontal stabilizer and a second horizontal stabilizer. The first horizontal stabilizer may project out from the stabilizer first side to the first turbine engine. The second horizontal stabilizer may project out from the stabilizer second side to the second turbine engine.

The assembly may also include a first horizontal stabilizer and a second horizontal stabilizer. The first horizontal stabilizer may be moveably mounted to the vertical stabilizer at the stabilizer first side. The first turbine engine may be fixedly mounted to the first horizontal stabilizer. The second horizontal stabilizer may be moveably mounted to the vertical stabilizer at the stabilizer second side. The second turbine engine may be fixedly mounted to the second horizontal stabilizer.

The actuation system may be configured as or otherwise include a linear actuator in the vertical stabilizer. The linear actuator may be configured to move the first turbine engine and the second turbine engine together relative to the vertical stabilizer.

The assembly may also include an aircraft body extending along a centerline between a body forward end and a body aft end. The vertical stabilizer may be connected to the aircraft body at the body aft end. The vertical stabilizer may project vertically out from a gravitational top side of the aircraft body.

The assembly may also include a first aircraft propulsion system and a second aircraft propulsion system. The first aircraft propulsion system may be mounted to the aircraft body at the gravitational top side of the aircraft body. The second aircraft propulsion system may be mounted to the aircraft body at the gravitational top side of the aircraft body with the vertical stabilizer located laterally between the first aircraft propulsion system and the second aircraft propulsion system.

The aircraft body may be configured as or otherwise include a fuselage.

The aircraft body may be configured as a blended wing body.

The first turbine engine may be configured as or otherwise include a first turbofan engine. The second turbine engine may be configured as or otherwise include a second turbofan engine.

The assembly may also include a control system configured to control operation of the first turbine engine and the second turbine engine to concurrently provide equal levels of thrust.

The assembly may also include a control system configured to control operation of the first turbine engine and the second turbine engine to concurrently provide different levels of thrust.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
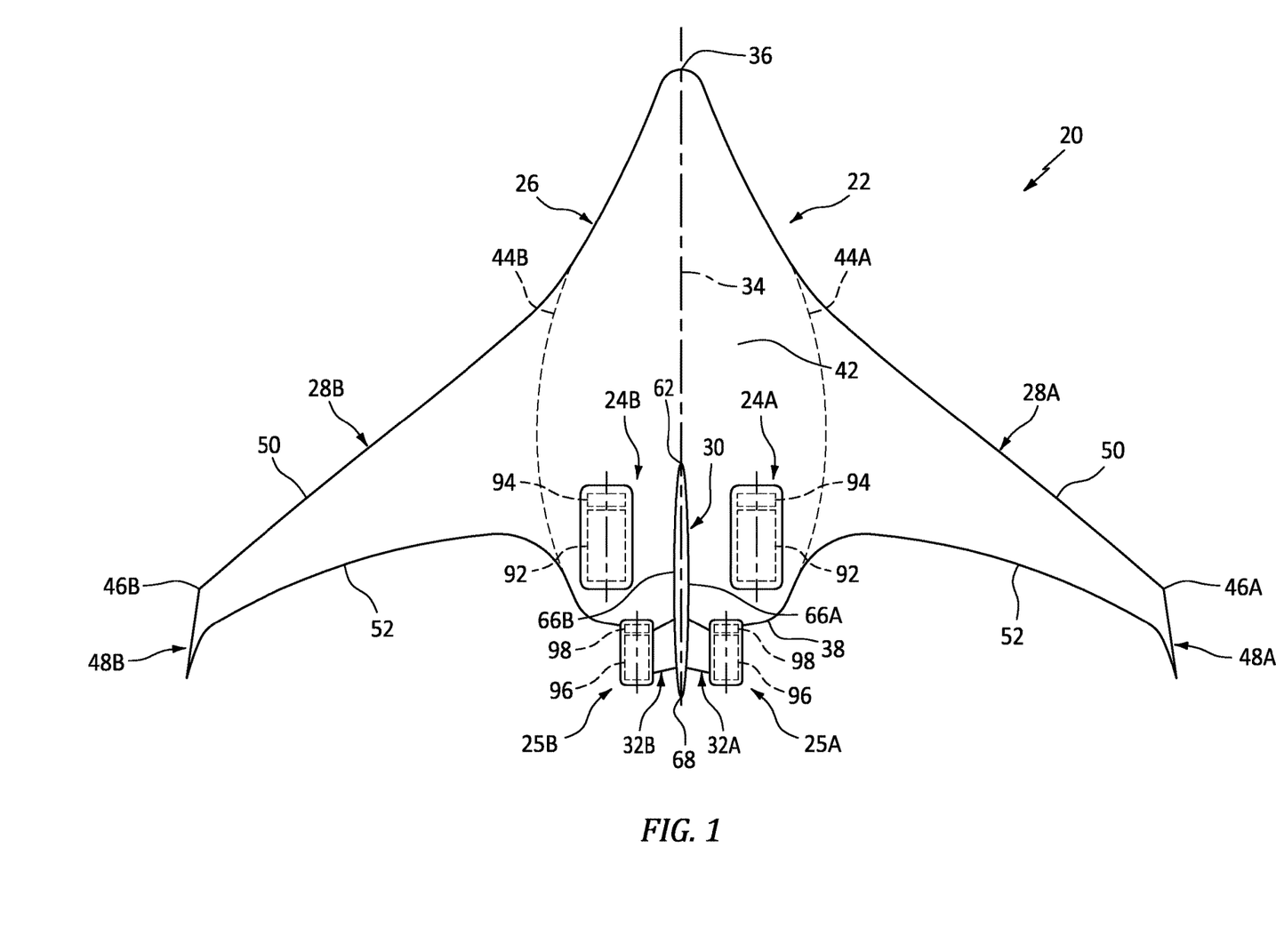
FIG. 1 is a plan view illustration of an aircraft.

FIG. 1 illustrates a blended wing body (BWB) aircraft 20. This aircraft 20 includes an airframe 22, one or more primary propulsion systems 24A and 24B (generally referred to as "24") and one or more secondary propulsion systems 25A and 25B (generally referred to as "25"). The aircraft airframe 22 includes a body 26 (e.g., a fuselage), one or more wings 28A and 28B (generally referred to as "28"), a vertical stabilizer 30 and one or more horizontal stabilizers 32A and 32B (generally referred to as "30"). Briefly, the vertical stabilizer 30 and the horizontal stabilizers 32 may form an empennage of the aircraft airframe 22.

Figure 2:
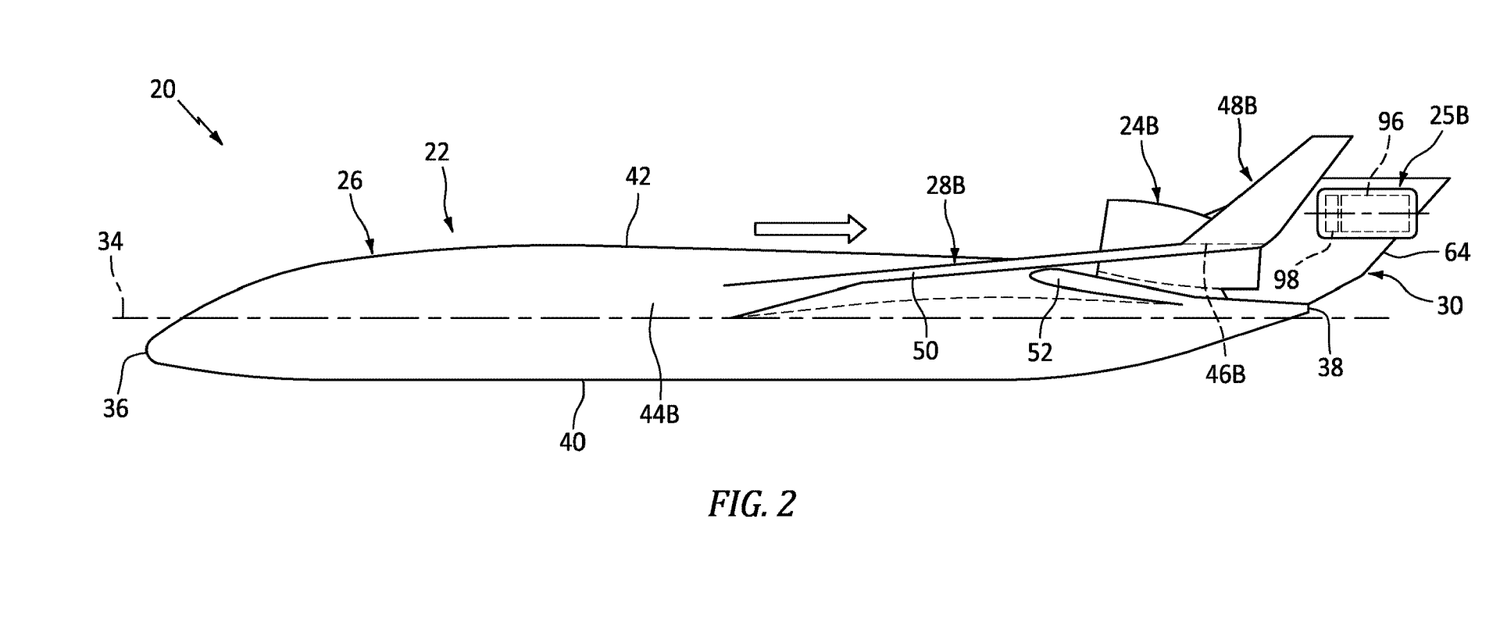
FIG. 2 is a side view illustration of the aircraft.
Figure 3:
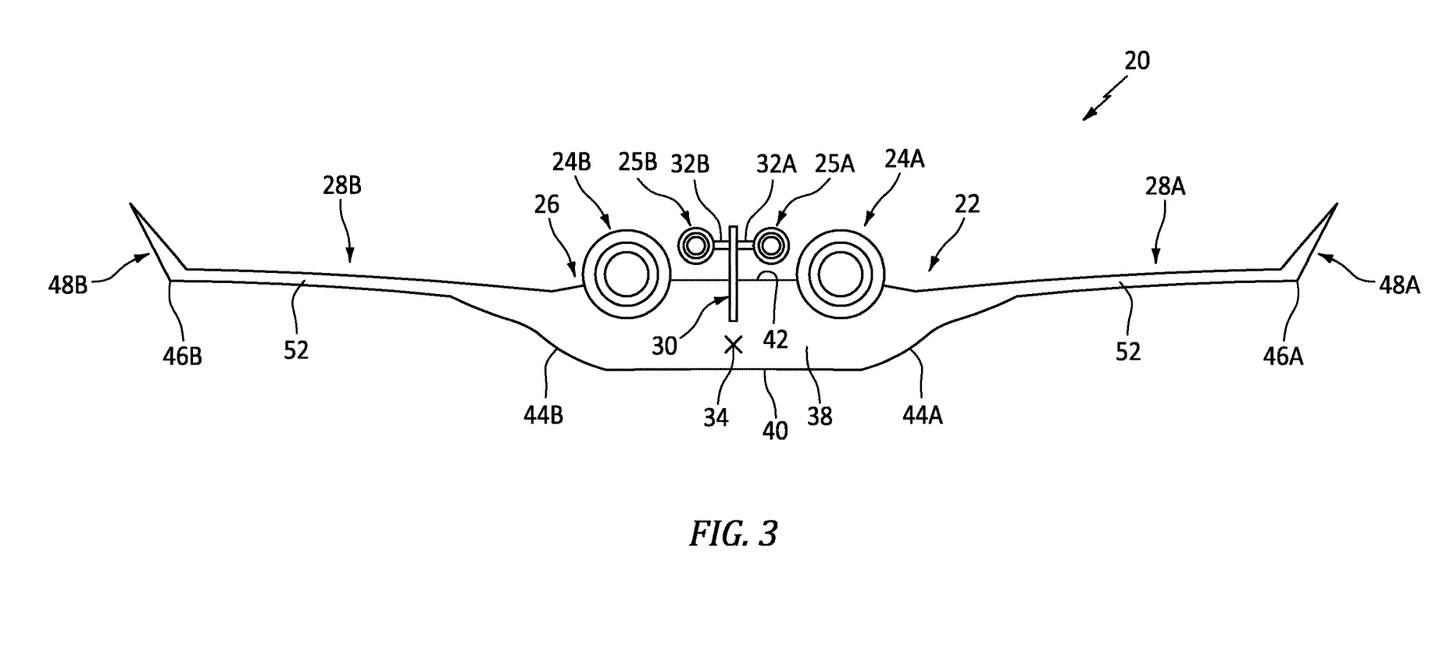
FIG. 3 is a rear end view illustration of the aircraft.

The aircraft body 26 extends longitudinally along a longitudinal centerline 34 between and to an upstream, forward end 36 of the aircraft body 26 and a downstream, aft end 38 of the aircraft body 26. This centerline 34 may be a centerline axis of the aircraft 20, the aircraft airframe 22 and/or the aircraft body 26. Referring to FIG. 2, the centerline 34 may be substantially (e.g., within +/−five or ten degrees) or completely parallel with a horizon line when the aircraft 20 is flying in level flight. The aircraft body 26 extends vertically between and to opposing vertical bottom and top sides 40 and 42 of the aircraft body 26. The body bottom side 40 is vertically below the body top side 42 with respect to a gravitational direction when the aircraft 20 is flying in level flight. Referring to FIGS. 1 and 3, the aircraft body 26 extends laterally between and to opposing lateral sides 44A and 44B (generally referred to as "44") of the aircraft body 26.

The aircraft wings 28A and 28B of FIGS. 1 and 3 are arranged to the opposing lateral sides 44A and 44B of the aircraft body 26. Each of the aircraft wings 28 is connected to (e.g., fixed to) the aircraft body 26. Each of the aircraft wings 28A, 28B projects spanwise along a span line of the respective aircraft wing 28A, 28B out from the aircraft body 26, at the respective body lateral side 44A, 44B, to a distal tip 46A, 46B of the respective aircraft wing 28A, 28B. At the wing tip 46A, 46B, the respective aircraft wing 28A, 28B may (or may not) be configured with a winglet 48A, 48B. Each of the aircraft wings 28 of FIG. 1 extends longitudinally along a mean line of the respective aircraft wing 28 from a leading edge 50 of the respective aircraft wing 28 to a trailing edge 52 of the respective aircraft wing 28. The wing leading edge 50 of FIG. 1, at a base of the respective aircraft wing 28, is longitudinally spaced aft, downstream from the body forward end 36. The wing trailing edge 52 of FIG. 1, at the wing base, is longitudinally spaced forward, upstream from the body aft end 38. The present disclosure, however, is not limited to such an exemplary aircraft wing arrangement.

The vertical stabilizer 30 of FIGS. 1 and 3 is disposed along the body top side 42. This vertical stabilizer 30 is arranged laterally between the primary propulsion systems 24 longitudinally at (e.g., on, adjacent or proximate) the body aft end 38. The vertical stabilizer 30 is connected to (e.g., fixed to) the aircraft body 26 at the body top side 42.

Figure 4A:
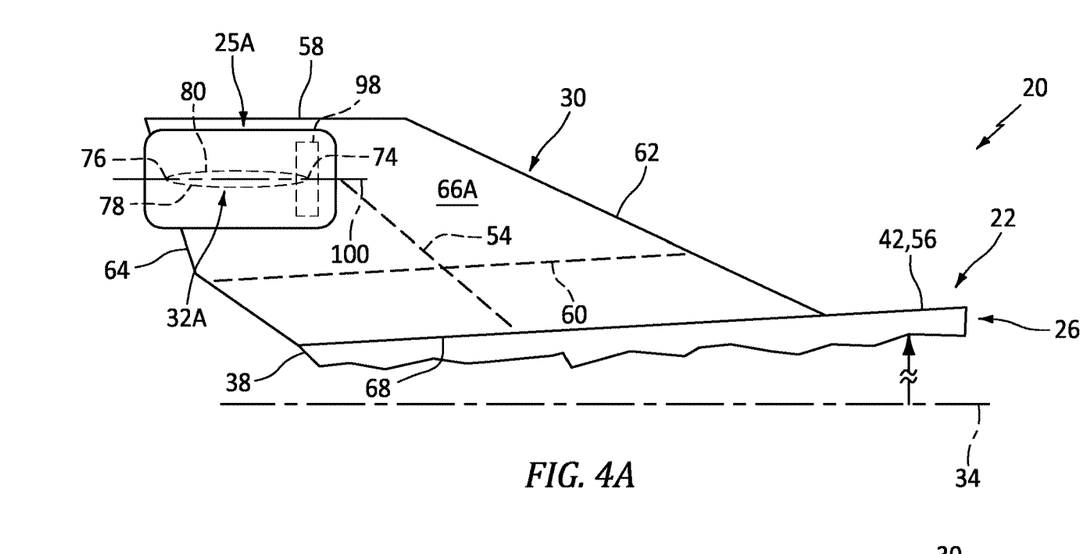
FIG. 4A is a partial side view illustration of a section of the aircraft along a first side of a vertical stabilizer.
Figure 4B:
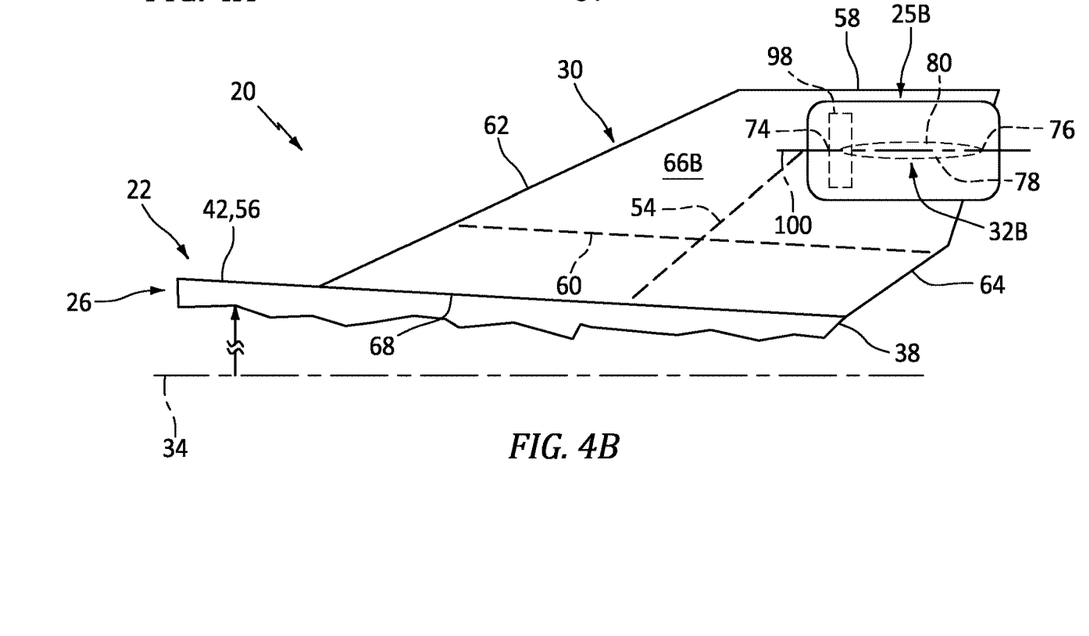
FIG. 4B is a partial side view illustration of a section of the aircraft along a second side of the vertical stabilizer.
Figure 5:
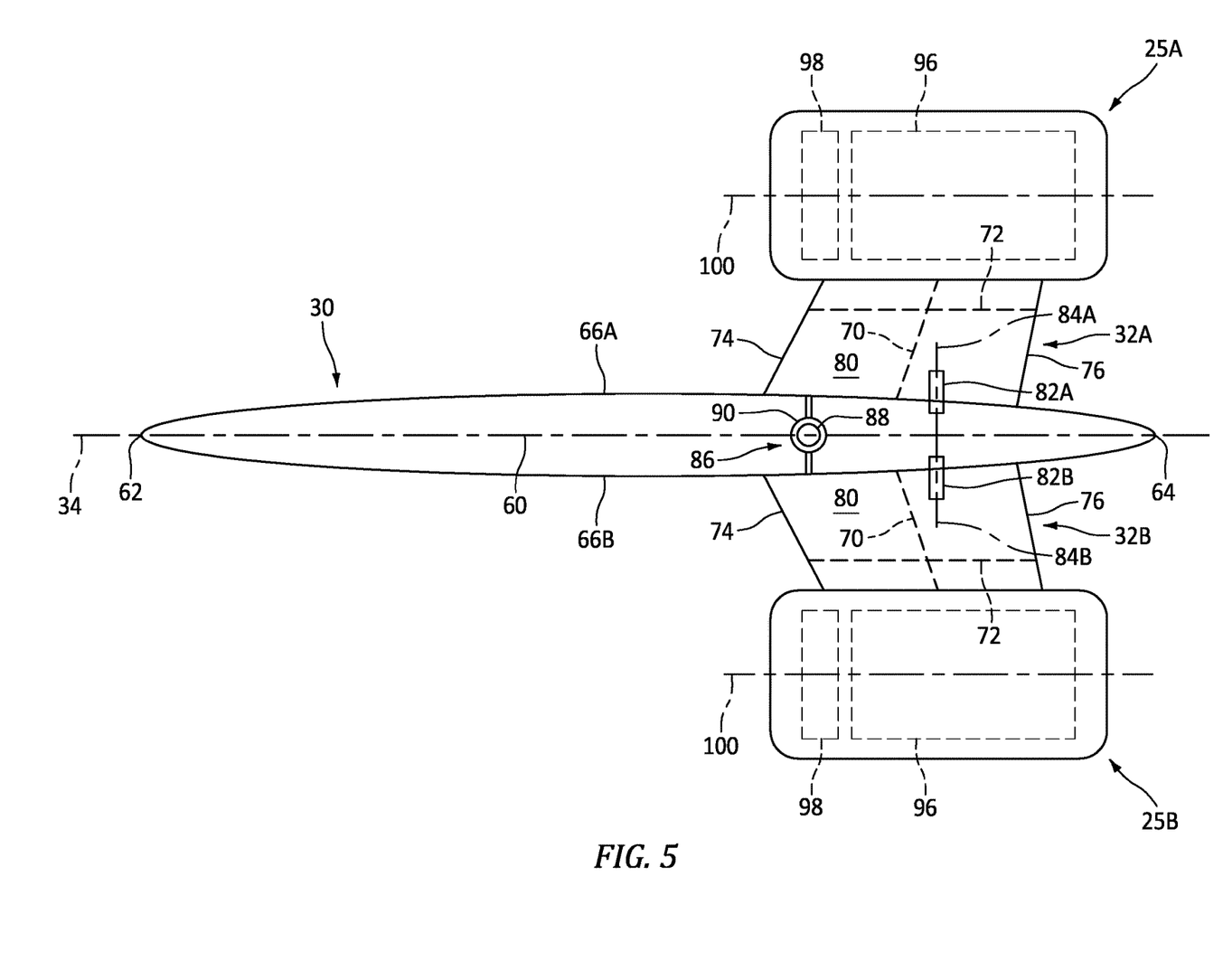
FIG. 5 is a plan view illustration of an empennage with multiple secondary propulsion systems.

The vertical stabilizer 30 may be configured as or may otherwise include a stationary vane. The vertical stabilizer 30 of FIGS. 4A and 4B, for example, projects spanwise along a span line 54 of the vertical stabilizer 30 (e.g., vertically) away from the aircraft body 26 and its body top side 42. More particularly, the vertical stabilizer 30 of FIGS. 4A and 4B projects spanwise out from an exterior surface 56 (e.g., an outermost aero surface) of the aircraft body 26 at the body top side 42 to a distal tip 58 of the vertical stabilizer 30. The vertical stabilizer 30 extends longitudinally along a mean line 60 (e.g., a chord line where the vertical stabilizer 30 is symmetrical) of the vertical stabilizer 30 from a leading edge 62 of the vertical stabilizer 30 to a trailing edge 64 of the vertical stabilizer 30. Referring to FIG. 5, the vertical stabilizer 30 extends laterally (e.g., perpendicular to the vertical stabilizer mean line 60) between and to opposing lateral sides 66A and 66B (generally referred to as "66") of the vertical stabilizer 30. These vertical stabilizer lateral sides 66 extend longitudinally along the vertical stabilizer mean line 60 between and meet at the vertical stabilizer leading edge 62 and the vertical stabilizer trailing edge 64. Referring to FIGS. 4A and 4B, each of the vertical stabilizer elements 62, 64, 66A and 66B extends spanwise from a base 68 of the vertical stabilizer 30 at the body top side 42 to the vertical stabilizer tip 58.

Figure 6:
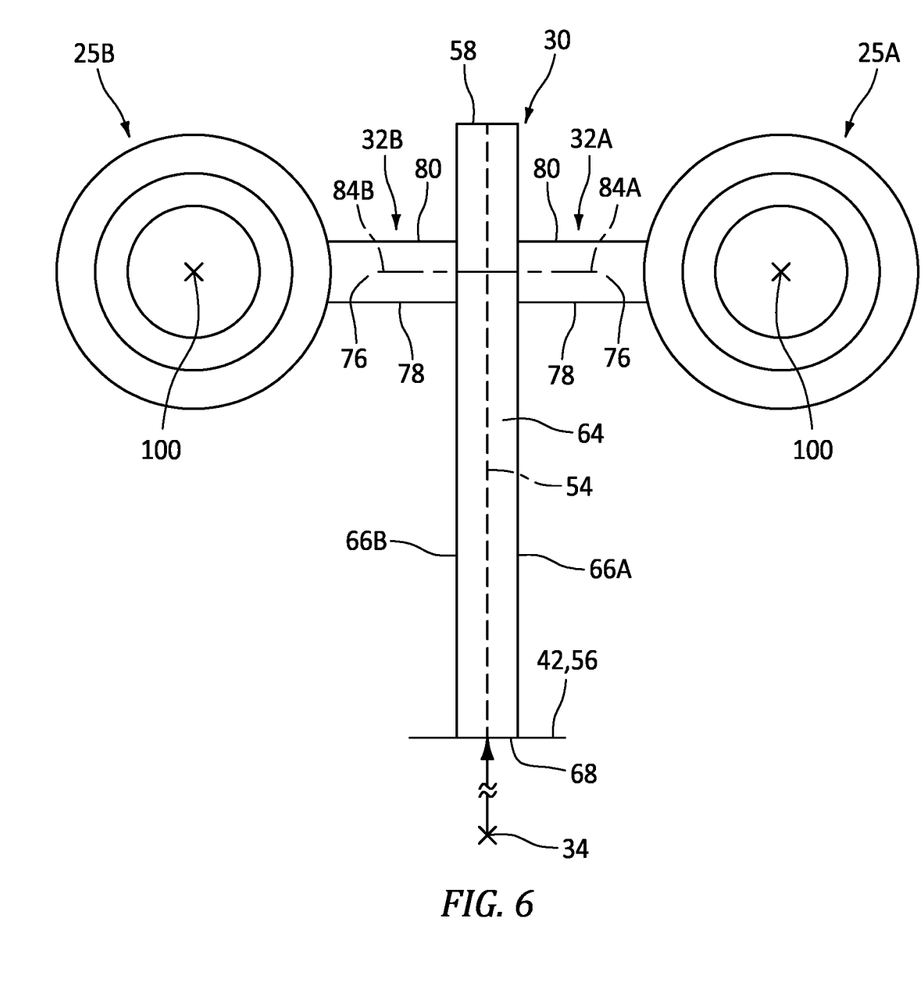
FIG. 6 is an end view illustration of the empennage with the secondary propulsion systems.

Referring to FIG. 6, the horizontal stabilizers 32A and 32B are arranged to the opposing lateral sides 66A and 66B of the vertical stabilizer 30. The horizontal stabilizers 32 of FIG. 6 are arranged vertically at or near the vertical stabilizer tip 58. However, it is contemplated the horizontal stabilizers 32 may alternatively be spaced vertically further down from vertical stabilizer tip 58.

Referring to FIG. 5, each of the horizontal stabilizers 32 may be configured as or otherwise include a movable vane. Each of the horizontal stabilizers 32A, 32B of FIG. 5, for example, projects spanwise along a span line 70 of the respective horizontal stabilizer 32 (e.g., laterally relative to the centerline 34) away from the vertical stabilizer 30 and its respective vertical stabilizer lateral side 66A, 66B. More particularly, each of the horizontal stabilizers 32A, 32B of FIG. 5 projects spanwise out from the vertical stabilizer 30 at its respective vertical stabilizer lateral side 66A, 66B to a respective one of the secondary propulsion systems 25A, 25B. Each of the horizontal stabilizers 32 extends longitudinally along a mean line 72 (e.g., a chord line where the respective horizontal stabilizer 32 has no camber) of the respective horizontal stabilizer 32 from a leading edge 74 of the horizontal stabilizer 32 to a trailing edge 76 of the respective horizontal stabilizer 32. Referring to FIG. 6, each of the horizontal stabilizers 32 extends (e.g., vertically) between and to vertically opposing bottom and top sides 78 and 80 of the respective horizontal stabilizer 32. These horizontal stabilizer vertical sides 78 and 80 extend longitudinally along the respective horizontal stabilizer mean line 72 (see FIG. 5) between and meet at the respective horizontal stabilizer leading edge 74 and the respective horizontal stabilizer trailing edge 76.

Each of the horizontal stabilizers 32 is movably mounted to the vertical stabilizer 30. Each of the horizontal stabilizers 32 of FIG. 5, for example, is pivotally mounted to the vertical stabilizer 30 through a pivot coupling 82A, 82B (generally referred to as "82") (e.g., a pin connection) at a base of the respective horizontal stabilizer 32. Each of the horizontal stabilizers 32 is configured to pivot about a respective pivot axis 84A, 84B (generally referred to as "84") of the respective pivot coupling 82A, 82B, where the pivot axes 84 of FIG. 5 are coaxial with one another. However, it is contemplated the pivot axes 84 may alternatively be angularly offset from one another (e.g., swept aft) while still being longitudinally and vertically aligned along the vertical stabilizer 30.

Figure 7A:
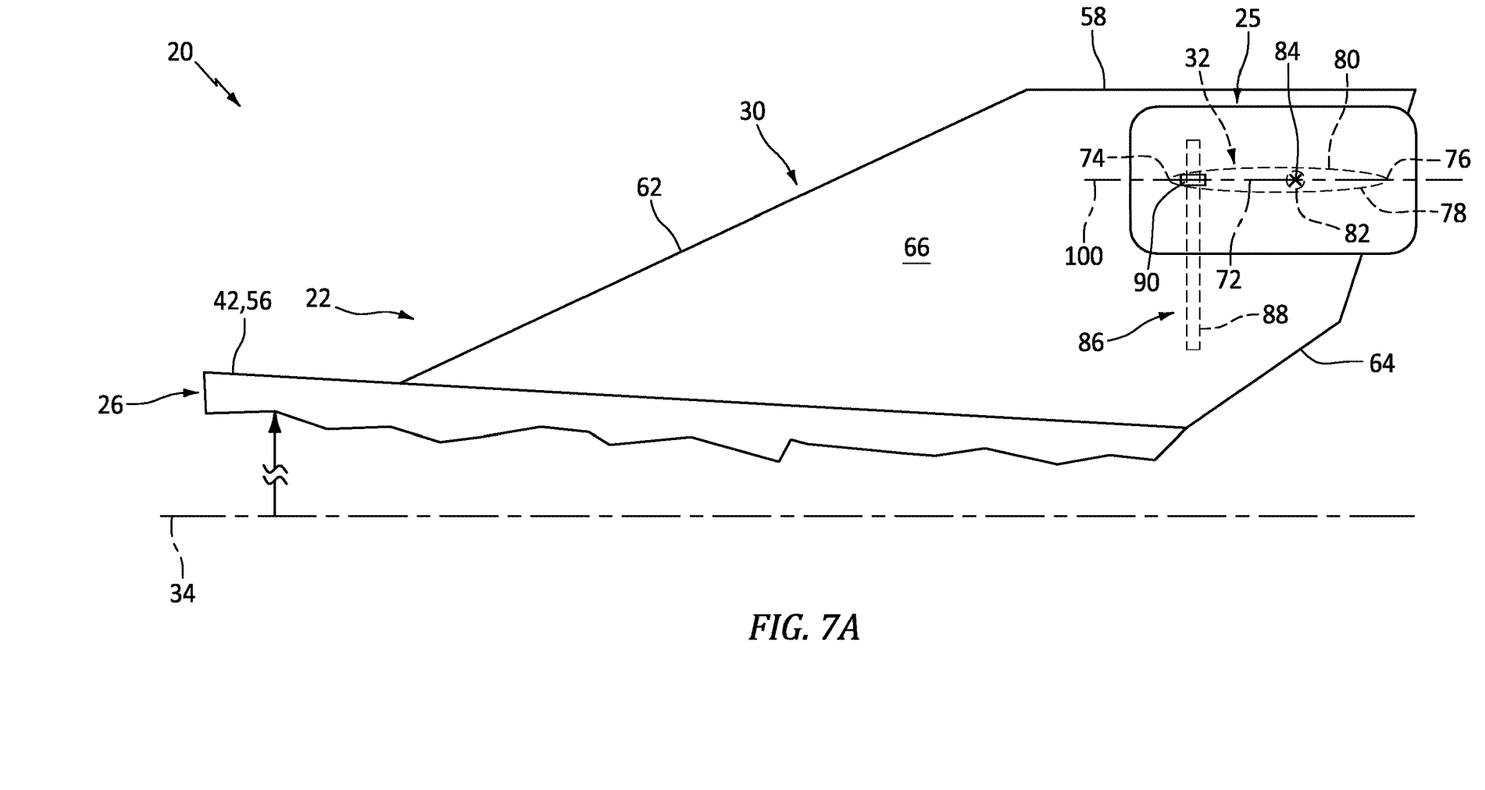
FIGS. 7A-C are partial side view illustrations of a section of the aircraft along the vertical stabilizer with a respective secondary propulsion system in various positions.
Figure 7B:
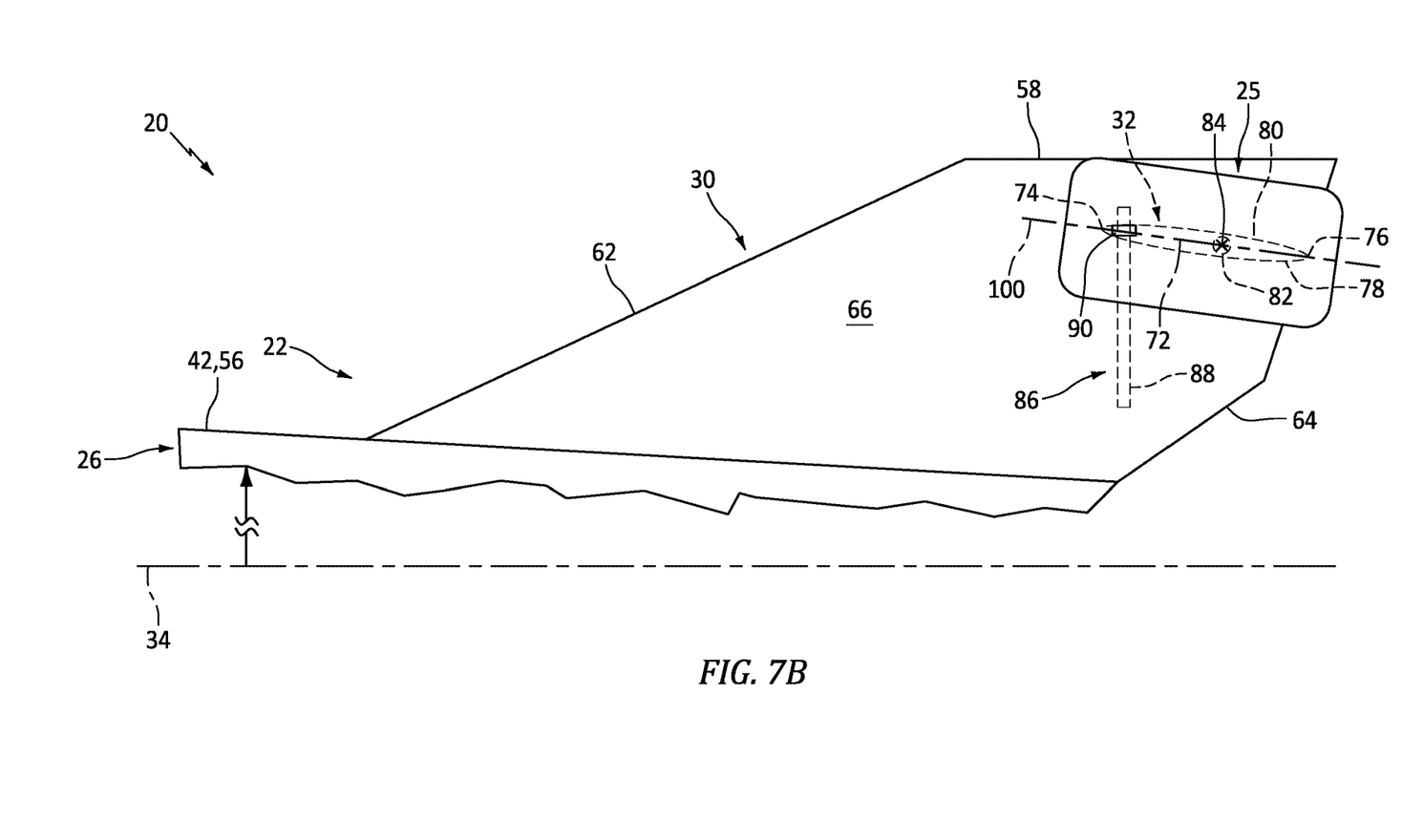
Figure 7C:
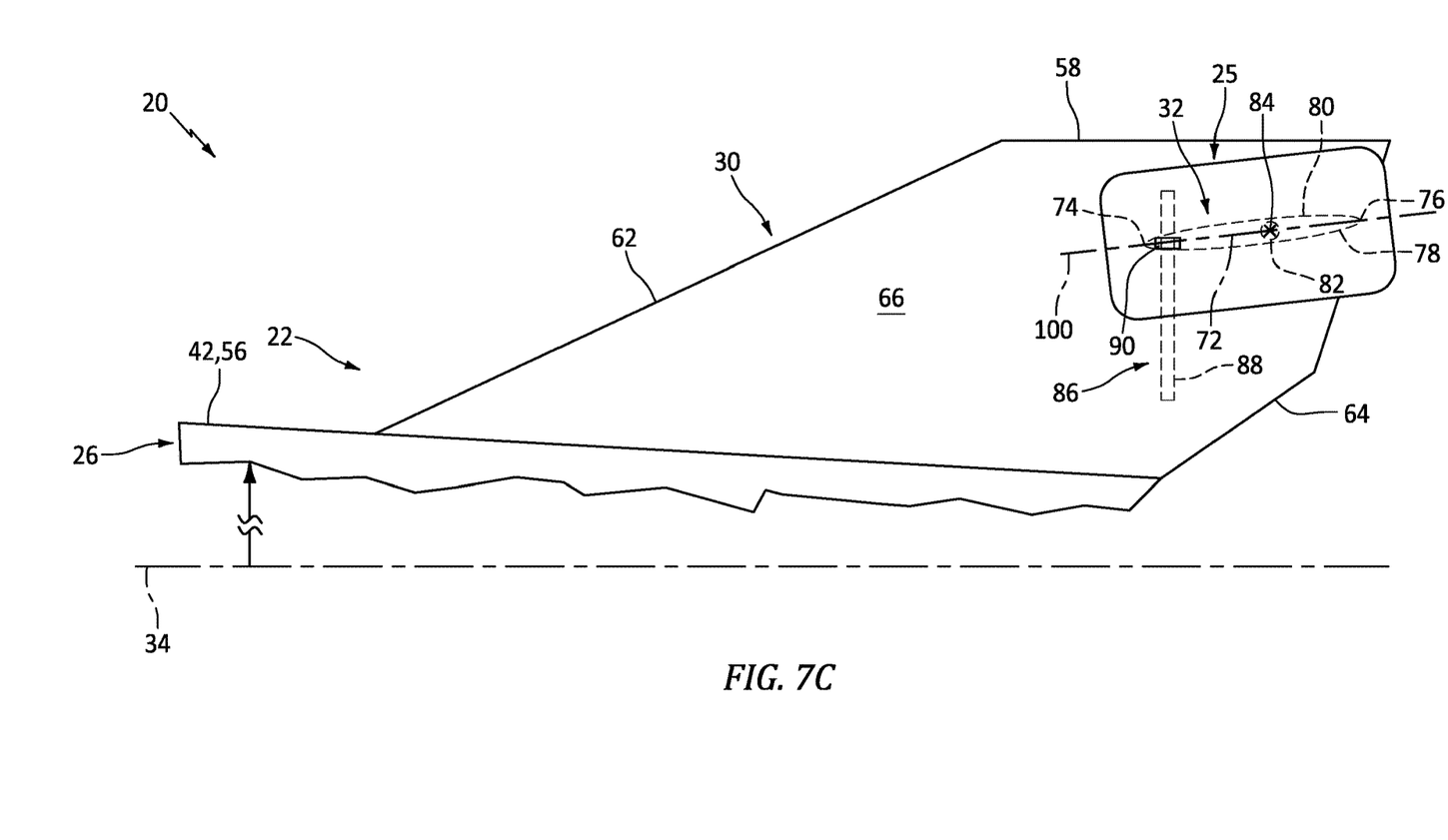

Referring to FIGS. 7A-C, each horizontal stabilizer 32 is operatively coupled to an actuation system 86. This actuation system 86 is configured to move each horizontal stabilizer 32 relative to the vertical stabilizer 30 and, thus, the aircraft body 26. The actuation system 86 of FIGS. 7A-C, for example, is configured to pivot each horizontal stabilizer 32 about the pivot axis 84 such that the respective horizontal stabilizer leading edge 74 moves vertically up and down along the vertical stabilizer 30. Of course, the actuation system 86 may also or alternatively pivot each horizontal stabilizer 32 about the pivot axis 84 such that the respective horizontal stabilizer trailing edge 76 moves vertically up and down along the vertical stabilizer 30.

The actuation system 86 of FIGS. 7A-C includes a linear actuator 88 housed within the vertical stabilizer 30; see also FIG. 5. A movable member 90 of the linear actuator 88 is pivotally connected to each vertical stabilizer 30 at a location that is spanwise spaced from the respective pivot coupling 82 and its pivot axis 84. The linear actuator 88 may thereby move its movable member 90 vertically up or down to push or pull the respective horizontal stabilizer leading edge 74 up or down. An example of the linear actuator 88 is a leadscrew, where the movable member 90 is a leadscrew nut block. Here, the single linear actuator 88 is provided to move (e.g., pivot) both of the horizontal stabilizers 32 of FIGS. 5 and 6. Movement of the horizontal stabilizers 32 is thereby synchronized and the same. It is contemplated, however, the actuation system 86 may alternatively include a plurality of linear actuators, where each linear actuator independently moves a respective one of the horizontal stabilizers 32. Moreover, while the actuation system 86 is described above with the linear actuator 88 (or multiple linear actuators), it is contemplated other types of actuators may alternatively be utilized.

Referring to FIG. 1, each of the primary propulsion systems 24 is connected to (e.g., fixed to) the aircraft body 26 at the body top side 42 and the body aft end 38. These primary propulsion systems 24 may be located longitudinally upstream, forward of the secondary propulsion systems 25 along the centerline 34. The primary propulsion systems 24 are arranged to the opposing lateral sides of the vertical stabilizer 30. The first primary propulsion system 24A of FIG. 1, for example, is spaced laterally from the vertical stabilizer 30 at the vertical stabilizer first side 66A by a lateral first distance. The second primary propulsion system 24B of FIG. 1 is spaced laterally from the vertical stabilizer 30 at the vertical stabilizer second side 66B by a lateral second distance, which second distance may be equal to the first distance. The vertical stabilizer 30 may thereby be arranged laterally midway between the primary propulsion systems 24. The vertical stabilizer 30 of FIG. 1 may also longitudinally overlap a portion or an entirety of each primary propulsion system 24 along the centerline 34.

Each primary propulsion system 24 of FIG. 1 is configured as a ducted rotor aircraft propulsion system. Examples of the ducted rotor aircraft propulsion system include, but are not limited to, a turbofan propulsion system and a turbojet propulsion system. Each primary propulsion system 24 of FIG. 1, for example, includes an aircraft powerplant 92 and a ducted bladed rotor 94 (e.g., a propulsor rotor such as a fan rotor, a first stage compressor rotor, etc.) rotationally driven by the aircraft powerplant 92. The aircraft powerplant 92 may be configured as or otherwise include a turbine engine powered by traditional fuels or alternative fuels (e.g., sustainable aviation fuel, liquid or gaseous hydrogen ($H_2$), etc.). Alternatively, the aircraft powerplant 92 may be configured as or otherwise include a rotary engine (e.g., a Wankel cycle engine), a hybrid-electric engine, or any other internal combustion (IC) engine or electric motor operable to drive rotation of the bladed rotor 94. The present disclosure, however, is not limited to the foregoing exemplary primary propulsion system and/or powerplant types or configurations. It is contemplated, for example, each primary propulsion system 24 may alternatively be configured as an open rotor aircraft propulsion system. Examples of the open rotor aircraft propulsion system include, but are not limited to, a pusher fan propulsion system and a propfan propulsion system.

Referring to FIG. 5, each of the secondary propulsion systems 25 is connected to (e.g., fixed to) a respective one of the horizontal stabilizers 32 at, for example, an outer distal end of the respective horizontal stabilizer 32. Each of the secondary propulsion systems 25 is thereby movably (e.g., pivotally) mounted to the vertical stabilizer 30 through the respective horizontal stabilizer 32 and its respective pivot coupling 82. Each of the secondary propulsion systems 25 is also moveable relative to the vertical stabilizer 30 and, thus, the aircraft body 26 using the actuation system 86 of FIGS. 7A-C.

Each secondary propulsion system 25 of FIG. 5 is configured as a ducted rotor aircraft propulsion system. Examples of the ducted rotor aircraft propulsion system include, but are not limited to, a turbofan propulsion system and a turbojet propulsion system. Each secondary propulsion system 25 of FIG. 5, for example, includes an aircraft powerplant 96 and a ducted bladed rotor 98 (e.g., a propulsor rotor such as a fan rotor, a first stage compressor rotor, etc.) rotationally driven by the aircraft powerplant 96. The aircraft powerplant 96 may be configured as or otherwise include a turbine engine powered by traditional fuels or alternative fuels (e.g., sustainable aviation fuel, liquid or gaseous hydrogen ($H_2$), etc.). Alternatively, the aircraft powerplant 96 may be configured as or otherwise include a rotary engine (e.g., a Wankel cycle engine), a hybrid-electric engine, or any other internal combustion (IC) engine or electric motor operable to drive rotation of the bladed rotor 98. The present disclosure, however, is not limited to the foregoing exemplary secondary propulsion system and/or powerplant types or configurations. It is contemplated, for example, each secondary propulsion system 25 may alternatively be configured as an open rotor aircraft propulsion system. Examples of the open rotor aircraft propulsion system include, but are not limited to, a pusher fan propulsion system and a propfan propulsion system.

During operation of the aircraft 20 of FIG. 1, the primary propulsion systems 24 are operated to provide a majority of or even all (during certain operating modes) aircraft thrust for aircraft flight. The primary propulsion systems 24 may be sized such that the aircraft 20 may fly solely under primary propulsion system power. The secondary propulsion systems 25 may be operated, on the other hand, to enhance aircraft operation. The secondary propulsion systems 25, for example, may be operated to boost aircraft thrust during certain relatively high thrust maneuvers. Examples of these relatively high thrust maneuvers include, but are not limited to, aircraft takeoff, aircraft climb and/or high speed aircraft flight. The secondary propulsion systems 25 may also or alternatively be operated to enhance aircraft maneuvering, particularly where the aircraft is a blended wing body aircraft. The actuation system 86 of FIGS. 7A-C, for example, may be operated to selectively vector secondary propulsion system thrust. For example, where the actuation system 86 moves the horizontal stabilizer leading edge 74 vertically up to the position of FIG. 7B, a rotational axis 100 of the bladed rotor 98 of each secondary propulsion system 25 is (e.g., positively) acutely angled relative to the centerline 34. Here, the secondary propulsion system thrust may facilitate pitching the aircraft 20 and its body forward end 36 (see FIG. 2) vertically down; e.g., towards ground. In another example, where the actuation system 86 moves the horizontal stabilizer leading edge 74 vertically down to the position of FIG. 7C, the rotational axis 100 of the bladed rotor 98 of each secondary propulsion system 25 is (e.g., negatively) acutely angled relative to the centerline 34. Here, the secondary propulsion system thrust may facilitate pitching the aircraft 20 and its body forward end 36 (see FIG. 2) vertically up; e.g., away from the ground. Thus, by moving the secondary propulsion system 25 relative to the vertical stabilizer 30 and, thus, the aircraft body 26, the secondary propulsion system thrust may be used to change and/or trim the aircraft pitch.

Figure 8:
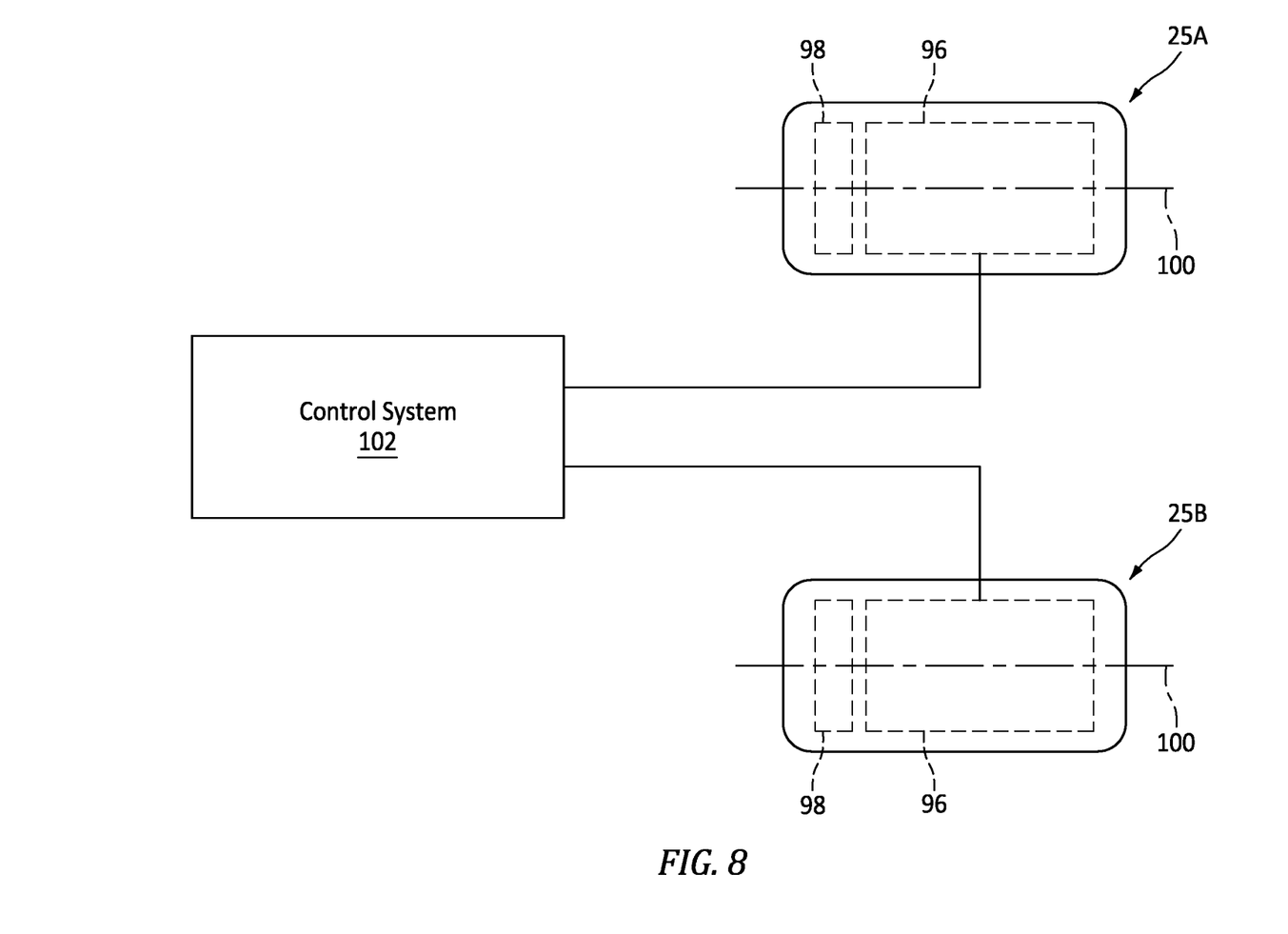
FIG. 8 is a schematic illustration of the secondary propulsion systems with a control system.

FIG. 8 illustrates a control system 102 for the secondary propulsion systems 25. This control system 102 may be configured as or otherwise include an onboard engine controller; e.g., an electronic engine controller (EEC), an electronic control unit (ECU), a full-authority digital engine controller (FADEC), etc. The control system 102 is in signal communication with (e.g., hardwired and/or wirelessly coupled to) various system components for each secondary propulsion system 25. The control system 102 of FIG. 8 is configured to control operation of the secondary propulsion systems 25. The control system 102, for example, may signal the secondary propulsion systems 25 to concurrently provide equal levels of thrust. In another example, the control system 102 may signal the secondary propulsion systems 25 to concurrently provide different levels of thrust. By providing different levels of thrust, the secondary propulsion systems 25 may be used to change or trim aircraft yaw. The control system 102 may also be in signal communication with and configured to control operation of the actuation system 86 of FIGS. 5 and 7A-C.

Figure 9:
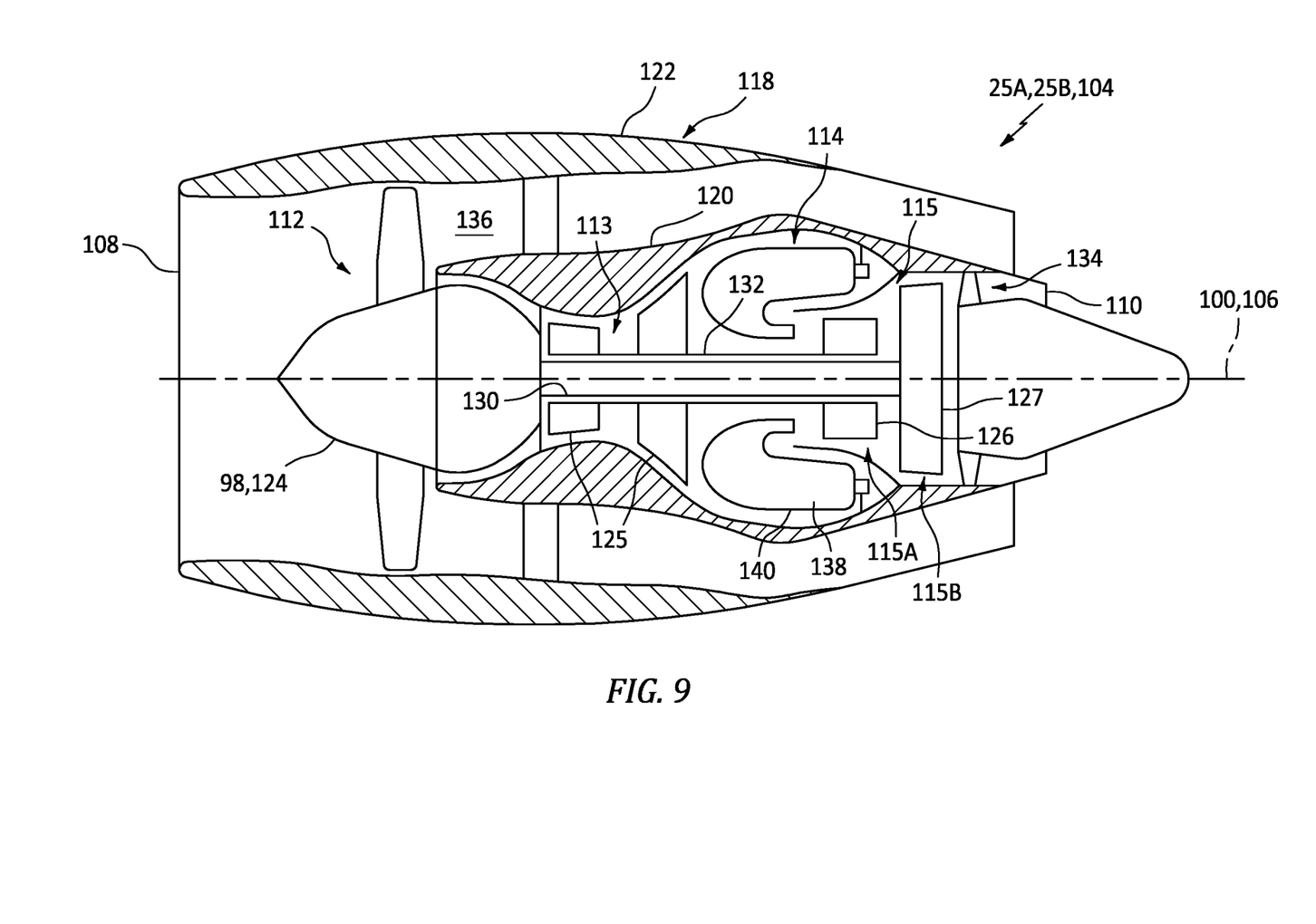
FIG. 9 is a side sectional schematic illustration of a turbofan turbine engine.

FIG. 9 illustrates an exemplary one of the secondary propulsion systems 25. This secondary propulsion system 25 of FIG. 9 is configured as a turbofan turbine engine 104. The secondary propulsion system 25 of FIG. 9, for example, extends axially along a centerline axis 106 (e.g., the axis) between an upstream airflow inlet 108 and a downstream airflow exhaust 110. The secondary propulsion system 25 of FIG. 9 includes a fan section 112, a compressor section 113, a combustor section 114 and a turbine section 115. The turbine section 115 includes a high pressure turbine (HPT) section 115A and a low pressure turbine (LPT) section 115B, which LPT section 115B may also be referred to as a power turbine (PT) section.

The engine sections 112-115B are arranged within an engine housing 118. This engine housing 118 includes an inner housing structure 120 and an outer housing structure 122. The inner housing structure 120 may house one or more of the engine sections 113-115B; e.g., a core of the turbine engine 104. The outer housing structure 122 may house at least the fan section 112. The inner and the outer housing structures 120 and 122 of FIG. 9 also form a bypass duct.

Each of the engine sections 112, 113, 115A and 115B includes a respective bladed rotor 124-127. The fan rotor 124 (e.g., the bladed rotor 98) is connected to and driven by the LPT rotor 127 through a low speed shaft 130. At least (or only) the fan rotor 124, the LPT rotor 127 and the low speed shaft 130 may collectively form a low speed rotating assembly. The compressor rotor 125 is connected to and driven by the HPT rotor 126 through a high speed shaft 132. At least (or only) the compressor rotor 125, the HPT rotor 126 and the high speed shaft 132 may collectively form a high speed rotating assembly. The engine shafts 130 and 132 are rotatably supported by a plurality of bearings (not shown) about the centerline axis 106 (e.g., the axis). Each of these bearings is connected to the engine housing 118 by at least one stationary structure.

During operation, air enters the secondary propulsion system 25 of FIG. 9 through the airflow inlet 108. This air is directed through the fan section 112 and into a core flowpath 134 and a bypass flowpath 136. The core flowpath 134 extends sequentially through the engine sections 113-115B. The air within the core flowpath 134 may be referred to as "core air". The bypass flowpath 136 extends through the bypass duct, which bypasses (e.g., flows along and outside of) the engine core. The air within the bypass flowpath 136 may be referred to as "bypass air".

The core air is compressed by the compressor rotor 125 and directed into a combustion chamber 138 (e.g., annular combustion chamber) of a combustor 140 (e.g., annular combustor) in the combustor section 114. Fuel is injected into the combustion chamber 138 and mixed with the compressed core air to provide a fuel-air mixture. This fuel air mixture is ignited and combustion products thereof flow through and sequentially cause the HPT rotor 126 and the LPT rotor 127 to rotate. The rotation of the HPT rotor 126 drives rotation of the compressor rotor 125 and, thus, compression of the air received from a core airflow inlet. The rotation of the LPT rotor 127 drives rotation of the fan rotor 124. The rotation of the fan rotor 124 propels the bypass air through and out of the bypass flowpath 136 to provide a majority of the second propulsion system thrust. Some of the second propulsion system thrust may also come from the combustion products exhausted from the core flowpath 134.

Each secondary propulsion system 25 may be configured as or otherwise include various turbine engines other than the one described above. The turbine engine 104, for example, may be a geared turbine engine or a direct drive turbine engine. The turbine engine 104 may include a single spool, two spools (e.g., see FIG. 9), or more than two spools. Moreover, while the turbine engine 104 is shown in FIG. 9 as the turbofan turbine engine, the turbine engine 104 may alternatively be configured as a turbojet turbine engine or any other suitable turbine engine.

In some embodiments, referring to FIGS. 7A-C, the actuation system 86 is coupled to each secondary propulsion system 25 through the respective horizontal stabilizer 32. However, in other embodiments, each secondary propulsion system 25 may alternatively be independently movably (e.g., pivotally) mounted to the vertical stabilizer 30 such that the respective secondary propulsion system 25 may move independent of the respective horizontal stabilizer 32. Moreover, in still other embodiments, each secondary propulsion system 25 may alternatively be mounted to the vertical stabilizer 30 without the respective horizontal stabilizer 32 therebetween; e.g., the horizontal stabilizers 32 may be omitted or arranged elsewhere. With such embodiments, each secondary propulsion system 25 may be movably (e.g., pivotally) mounted to the vertical stabilizer 30 though, for example, a respective pylon structure.

In some embodiments, one or more of the secondary propulsion systems 25 may (or may not) also be configured as an auxiliary power unit (APU) for the aircraft 20. One or more of the secondary propulsion systems 25, for example, may be configured to generate electricity for use elsewhere in the aircraft 20. One or more of the secondary propulsion systems 25 may also or alternatively be configured to provide bleed air to one or more other aircraft systems; e.g., compressed air for starting the primary propulsion systems 24, compressed air for an aircraft environmental control system (ECS), etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
an aircraft body extending along a centerline between a body forward end and a body aft end;
a vertical stabilizer extending spanwise from a stabilizer base to a stabilizer tip, the vertical stabilizer extending longitudinally from a stabilizer leading edge to a stabilizer trailing edge, and the vertical stabilizer extending laterally between a stabilizer first side and a stabilizer second side, the vertical stabilizer connected to the aircraft body at the body aft end, and the vertical stabilizer projecting vertically out from a gravitational top side of the aircraft body;
a first turbine engine movably mounted to the vertical stabilizer at the stabilizer first side;
a second turbine engine moveably mounted to the vertical stabilizer at the stabilizer second side;
an actuation system configured to move the first turbine engine and the second turbine engine relative to the vertical stabilizer;
a first aircraft propulsion system mounted to the aircraft body at the gravitational top side of the aircraft body; and
a second aircraft propulsion system mounted to the aircraft body at the gravitational top side of the aircraft body with the vertical stabilizer located laterally between the first aircraft propulsion system and the second aircraft propulsion system.

2. The assembly of claim 1, wherein the actuation system is configured to move the first turbine engine and the second turbine engine together.

3. The assembly of claim 1, wherein the first turbine engine and the second turbine engine are each pivotally mounted to the vertical stabilizer.

4. The assembly of claim 1, wherein the actuation system is configured to
pivot the first turbine engine about a first pivot axis; and
pivot the second turbine engine about a second pivot axis that is concentric with the first pivot axis.

5. The assembly of claim 1, further comprising:
the first turbine engine comprising a first engine rotating assembly rotatable about a first engine axis, the first engine rotating assembly comprising a first engine turbine rotor, and the actuation system configured to change an angle between the first engine axis and the centerline by moving the first turbine engine relative to the vertical stabilizer; and
the second turbine engine comprising a second engine rotating assembly rotatable about a second engine axis, the second engine rotating assembly comprising a second engine turbine rotor, and the actuation system configured to change an angle between the second engine axis and the centerline by moving the second turbine engine relative to the vertical stabilizer.

6. The assembly of claim 1, further comprising:
a first horizontal stabilizer projecting out from the stabilizer first side to the first turbine engine; and
a second horizontal stabilizer projecting out from the stabilizer second side to the second turbine engine.

7. The assembly of claim 1, further comprising:
a first horizontal stabilizer moveably mounted to the vertical stabilizer at the stabilizer first side, and the first turbine engine fixedly mounted to the first horizontal stabilizer; and a second horizontal stabilizer moveably mounted to the vertical stabilizer at the stabilizer second side, and the second turbine engine fixedly mounted to the second horizontal stabilizer.

8. The assembly of claim 1, wherein
the actuation system comprises a linear actuator in the vertical stabilizer; and
the linear actuator is configured to move the first turbine engine and the second turbine engine together relative to the vertical stabilizer.

9. The assembly of claim 1, wherein the aircraft body comprises a fuselage.

10. The assembly of claim 1, wherein the aircraft body is configured as a blended wing body.

11. The assembly of claim 1, wherein
the first turbine engine comprises a first turbofan engine; and
the second turbine engine comprises a second turbofan engine.

12. The assembly of claim 1, further comprising a control system configured to control operation of the first turbine engine and the second turbine engine to concurrently provide equal levels of thrust.

13. The assembly of claim 1, further comprising a control system configured to control operation of the first turbine engine and the second turbine engine to concurrently provide different levels of thrust.

14. An assembly for an aircraft, comprising:
a vertical stabilizer extending spanwise from a stabilizer base to a stabilizer tip, the vertical stabilizer extending longitudinally from a stabilizer leading edge to a stabilizer trailing edge, and the vertical stabilizer extending laterally between a stabilizer first side and a stabilizer second side;
a first propulsion system comprising a first ducted propulsor rotor rotatable about a first axis, the first propulsion system movably coupled to the vertical stabilizer at the stabilizer first side;
a second propulsion system comprising a second ducted propulsor rotor rotatable about a second axis, the second propulsion system movably coupled to the vertical stabilizer at the stabilizer second side; and
an actuation system configured to move the first axis and the second axis relative to the vertical stabilizer.

15. The assembly of claim 14, wherein
the first propulsion system comprises a first turbine engine; and
the second propulsion system comprises a second turbine engine.

16. An assembly for an aircraft, comprising:
an aircraft body extending along a centerline from a body forward end to a body aft end, the aircraft body comprising a fuselage;
a vertical stabilizer projecting vertically out from the aircraft body;
a first turbine engine movably mounted with the vertical stabilizer, the first turbine engine comprising a first engine rotating assembly rotatable about a first engine axis, and the first engine rotating assembly comprising a first engine turbine rotor; and
an actuation system configured to change an angle between the first engine axis and the centerline by moving the first turbine engine relative to the vertical stabilizer; and
a first aircraft propulsion system mounted to the aircraft body at a gravitational top side of the aircraft body.

17. The assembly of claim 16, further comprising:
a second turbine engine movably mounted with the vertical stabilizer, the second turbine engine comprising a second engine rotating assembly rotatable about a second engine axis that is offset from the first engine axis, and the second engine rotating assembly comprising a second engine turbine rotor; and
the actuation system further configured to change an angle between the second engine axis and the centerline by moving the second turbine engine relative to the vertical stabilizer.

* * * * *